United States Patent Office 3,216,793
Patented Nov. 9, 1965

3,216,793
CONTINUOUS PRODUCTION OF ANHYDROUS ALKALI METAL SULFITE
Walter Spormann, Bad Duerkheim-Seebach, and Joachim Heinke, Ludwigshafen (Rhine), Germany, assignors to Badische Anilin- & Soda-Fabrik Aktiengesellschaft, Ludwigshafen (Rhine), Rheinland-Pfalz, Germany
No Drawing. Filed Mar. 20, 1962, Ser. No. 181,185
Claims priority, application Germany, Mar. 24, 1961, B 61,849
3 Claims. (Cl. 23—129)

This invention relates to a process for the continuous production of anhydrous alkali metal sulfite.

The production of alkali sulfite, especially sodium sulfite, by reacting commercial alkali metal hydroxide solutions, especially 50% caustic soda solution, and a commercial about 40% solution of sodium hydrogen sulfite ($NaHSO_3$) is known. A sufite is thus obtained which is yellow in color by reason of its content of iron and which is separable from its mother liquor only with difficulty because it is present in very finely dispersed form. In particular it is not possible to effect separation of such finely dispersed compositions on continuous centrifuges, and when rotary filters or vacuum filters are used they rapidly become clogged so that continuous operation is rendered impossible. It is known that the yellow color of alkali metal sulfite can be avoided by freeing the commercial initial materials from their iron content prior to the reaction. This requires a special process. It is also known that alkali metal sulfite which is present in very finely dispersed form can be made filterable by keeping it at elevated temperature for a long period while stirring so that the crystals grow and an easily filtered crystal mash is formed. This measure requires a long period.

We have now found that a finely dispersed white alkali metal sulfite is obtained in a single operation from commercial alkali metal hydroxide solutions and commercial alkali metal hydrogen sulfite solutions by using an amount of alkali metal hydroxide greater than the stoichiometric amount so that an alkali excess of up to 12% is maintained in the mother liquor of the alkali metal sulfite suspension. In this way the iron remains in solution and can be separated with the mother liquor. The advantageous effect of the excess of alkali metal hydroxide is noticeable even with a small excess, for example at an excess of about 1%. Alkali metal sulfite in the present specification means sodium or potassium sulfite, while alkali metal hydroxide means sodium or potassium hydroxide and alkali metal hydrogen sulfite means sodium or potassium hydrogen sulfite. By the stoichiometric amount of alkali metal hydroxide we mean, for example, the amount of alkali metal (sodium) hydroxide necessary for the reaction:

$$NaOH + NaHSO_3 = Na_2SO_3 + H_2O$$

When carrying out the process according to this invention continuously it is advantageous to use such a large reaction vessel that the average residence period of the precipitated alkali metal sulfite in the precipitation vessel is at least 15 minutes. The residence period is the period between the entry of a particle of alkali metal sulfite into the reaction vessel and the exit of the same particle from the reaction vessel. In this way the formation of a finely dispersed crystal slurry is avoided and the alkali metal sulfite is obtained, without subsequent heating, in a readily filtered form because the precipitated alkali metal sulfite particles can grow in the precipitation vessel on the coarser particles present therein. For this purpose, a residence period of at least 15 minutes is required. Depending on the length of the residence period, the particles grow to readily filtered crystallites and especially when the residence period is from one to two hours a sulfite suspension is obtained which can be conveniently separated from the mother liquor on a continuous centrifuge. Residence periods of more than ten hours do not bring any further improvement in the size of the sulfite particles and are therefore not desirable. Since an alkali metal sulfite having adherent mother liquor containing alkali metal hydroxide can only be dried with difficulty and even when it has been dried with difficulty, attracts water again by reason of its hygroscopic properties, it is advantageous to remove the alkali metal hydroxide content of the alkali metal sulfite. When no special value is placed on a dry alkali metal sulfite, this is not necessary. Neutralization of the excess alkali metal hydroxide is advantageously effected with solutions of weak acids, preferably with a solution of alkali metal hydrogen sulfite, which is preferably reacted with the alkali metal sulfite after separation thereof, for example in a continuous centrifuge, for example by treating with the solution the alkali metal sulfite which is present in the centrifuge. In this way a colorless alkali metal sulfite is obtained which can readily be freed from its residual water content by conventional methods.

The invention is illustrated by, but not limited to, the following example.

Example 2 cubic meters of commercial sodium hydrogen sulfite solution ($NaHSO_3$ content=38.7%; Fe content= 0.0014%) and 0.88 cubic meter of 50% commercial caustic soda solution are introduced per hour through two separate pipes into an agitated vessel of 3 cubic meters capacity with a constant excess of NaOH. The temperature in the vessel is about 80° C. The precipitated sodium sulfite is separated from its mother liquor on a continuous centrifuge. 80 liters per hour of sodium hydrogen sulfite solution ($NaHSO_3$ content 38.4%) is sprayed continuously on the salt cake in the centrifuge. 1.01 metric tons per hour of white centrifuge-moist sodium sulfite is obtained with an iron content of 0.00045% in the dry substance. A 20% solution of this salt has a pH value of 9.25, the mother liquor contains 10.5% of NaOH, 9.2% of $Na_2SO_3$ and 0.0011% of iron.

We claim:

1. A process for continuous production of anhydrous alkali metal sulfite substantially free of iron impurities which comprises mixing aqueous alkali metal hydroxide solution and alkali metal hydrogen sulfite solution and forming an aqueous suspension of anhydrous alkali metal sulfite in an aqueous mother liquor, said aqueous mother liquor containing dissolved iron as an impurity, proportioning the quantities of said solutions to provide a stoichiometric excess of alkali metal hydroxide sufficient to result in about a 1–12% excess of alkali metal hydroxide in said mother liquor, whereby most of the iron impurity remains dissolved in said mother liquor, and separating the suspended alkali metal sulfite from said mother liquor to recover alkali metal sulfite essentially free from iron impurities.

2. A process as claimed in claim 1 wherein the suspended alkali metal sulfite is maintained in said mother liquor for at least fifteen minutes.

3. A process as claimed in claim 1, and treating the separated alkali metal sulfite with a solution of a weak acid to neutralize the residual alkali metal hydroxide therein.

References Cited by the Examiner

UNITED STATES PATENTS

| | | | |
|---|---|---|---|
| 2,705,187 | 3/55 | Terzier | 23—129 |
| 2,719,075 | 9/55 | Allen | 23—129 |
| 2,899,273 | 8/59 | Murphy | 23—129 |

MAURICE A. BRINDISI, *Primary Examiner.*